United States Patent
Coffman et al.

(10) Patent No.: US 9,586,676 B2
(45) Date of Patent: Mar. 7, 2017

(54) PNEUMATIC POSITIONING SYSTEM

(71) Applicant: The Boeing Company, Chicago, IL (US)

(72) Inventors: Jeffrey C. Coffman, Huntington Beach, CA (US); David E. Blanding, Hawthorne, CA (US)

(73) Assignee: The Boeing Company, Chicago, IL (US)

( * ) Notice: Subject to any disclaimer, the term of this patent is extended or adjusted under 35 U.S.C. 154(b) by 436 days.

(21) Appl. No.: 14/242,817

(22) Filed: Apr. 1, 2014

(65) Prior Publication Data
US 2015/0274281 A1    Oct. 1, 2015

(51) Int. Cl.
| | | |
|---|---|---|
| B64C 13/00 | (2006.01) |
| B64C 13/36 | (2006.01) |
| F15B 15/19 | (2006.01) |
| F15B 15/14 | (2006.01) |
| B64C 13/42 | (2006.01) |
| F15B 11/064 | (2006.01) |
| F15B 15/08 | (2006.01) |

(Continued)

(52) U.S. Cl.
CPC ............. *B64C 13/36* (2013.01); *B64C 13/42* (2013.01); *B64C 13/48* (2013.01); *B64C 13/50* (2013.01); *F15B 11/064* (2013.01); *F15B 15/088* (2013.01); *F15B 15/149* (2013.01); *F15B 15/19* (2013.01); *F15B 20/002* (2013.01); *F15B 11/123* (2013.01); *F15B 2211/21* (2013.01); *F15B 2211/8752* (2013.01); *F15B 2211/8757* (2013.01); *F15B 2211/8855* (2013.01); *Y02T 50/44* (2013.01)

(58) Field of Classification Search
CPC ..... B64C 13/36; B64C 2013/506; B64C 9/02; B64C 13/40; B64C 13/48; B64C 13/50; F15B 11/123; F15B 2211/851; F15B 2211/853; F15B 2211/21; F16D 2125/585
USPC ... 91/390, 53, 52, 169, 173; 92/8, 9, 10, 52, 92/53, 13.1, 13.4, 65, 63, 129, 151; 60/406, 399
See application file for complete search history.

(56) References Cited

U.S. PATENT DOCUMENTS

| | | | | |
|---|---|---|---|---|
| 4,002,105 A | * | 1/1977 | Bell | ......... F16H 61/30 92/151 |
| 4,125,059 A | * | 11/1978 | Tuji | ......... F15B 11/123 92/129 |

(Continued)

OTHER PUBLICATIONS

Blanding, David E., et al., "Positioning System for an Electromechanical Actuator", U.S. Appl. No. 14/242,826, filed Apr. 1, 2014.

(Continued)

*Primary Examiner* — Michael Leslie
*Assistant Examiner* — Dustin T Nguyen
(74) *Attorney, Agent, or Firm* — Kwan & Olynick LLP (57) ABSTRACT

Provided are mechanisms and processes for a pneumatic shaft positioning system. According to various examples, the pneumatic shaft positioning system includes a pyrotechnic valve that is configured to control the flow of gas from a pressurized gas source into a pressure chamber. The pressure chamber includes a first piston that is slidably coupled to the pressure chamber. When gas from the pressurized gas source fills the pressure chamber, the piston is configured to slide through the pressure chamber and force a shaft into a predetermined position.

19 Claims, 8 Drawing Sheets

(51) Int. Cl.
*F15B 20/00* (2006.01)
*B64C 13/48* (2006.01)
*B64C 13/50* (2006.01)
*F15B 11/12* (2006.01)

(56) References Cited

U.S. PATENT DOCUMENTS

| | | | | |
|---|---|---|---|---|
| 4,559,895 A | * | 12/1985 | Kijima | F02F 7/0046 |
| | | | | 116/200 |
| 6,164,182 A | * | 12/2000 | Tischer | F16H 61/30 |
| | | | | 91/172 |
| 7,190,096 B2 | | 3/2007 | Blanding | |
| 2008/0092687 A1 | * | 4/2008 | Bader | F16H 61/2807 |
| | | | | 74/473.11 |

OTHER PUBLICATIONS

"Actuator", Wikipedia, Retrieved from the Internet: < http://en.wikipedia.org/wiki/Actuator >, Accessed on Mar. 27, 2014, 4 pgs.
"Aircraft Flight Control System", Wikipedia, Retrieved from the Internet: < http://en.wikipedia.org/wiki/Aircraft_flight_control_system >, Accessed on Mar. 27, 2014, 7 pgs.
"Attitude Control", Wikipedia, Retrieved from the Internet: < http://en.wikipedia.org/wiki/Aircraft_attitude >, Accessed on Mar. 27, 2014, 8 pgs.
"Electrohydraulic Servo Valve", Wikipedia, Retrieved from the Internet: < http://en.wikipedia.org/wiki/Electro-hydraulic_servo_valve >, Accessed on Mar. 27, 2014, 2 pgs.

* cited by examiner

PNEUMATIC POSITIONING SYSTEM

BACKGROUND

Actuators are used in various mechanical devices to control the features and moving parts of these devices. Specifically, an actuator is a motor that is used to control a system, mechanism, device, structure, or the like. Actuators can be powered by various energy sources and can convert a chosen energy source into motion.

For instance, actuators are used in computer disk drives to control the location of the read/write head by which data is stored on and read from the disk. In addition, actuators are used in robots, i.e., in automated factories to assemble products. Actuators also operate brakes on vehicles; open and close doors; raise and lower railroad gates and perform numerous other tasks of everyday life. Accordingly, actuators have wide ranging uses.

In the field of aeronautics, actuators are used to control a myriad of control surfaces that allow aircraft to fly. For instance, each of the flaps, spoilers, and ailerons located in each wing, require an actuator. In addition, actuators in the tail control the rudder and elevators of an aircraft. Furthermore, actuators in the fuselage open and close the doors that cover the landing gear bays. Actuators are also used to raise and lower the landing gear of an aircraft. Moreover, actuators on each engine control thrust reversers by which a plane is decelerated.

Commonly used actuators fall into two general categories: hydraulic and electric, with the difference between the two categories being the motive force by which movement or control is accomplished. Hydraulic actuators require a pressurized, incompressible working fluid, usually oil. Electric actuators use an electric motor, the shaft rotation of which is used to generate a linear displacement using some sort of transmission.

Although hydraulic actuators have been widely used in airplanes, a problem with hydraulic actuators is the plumbing required to distribute and control the pressurized working fluid. In an airplane, a pump that generates high-pressure working fluid and the plumbing required to route the working fluid add weight and increase design complexity because the hydraulic lines must be carefully routed. In addition, possible failure modes in hydraulic systems include pressure failures, leaks, and electrical failures to servo valves that are used to position control surfaces. However, one inherent feature of hydraulic systems is that hydraulic flight control systems can use damping forces to maintain stability after a failure has been detected.

Electric actuators overcome many of the disadvantages of hydraulic systems. In particular, electric actuators, which are powered and controlled by electric energy, require only wires to operate and control. However, electric actuators can also fail during airplane operation. For instance, windings of electrical motors are susceptible to damage from heat and water. In addition, bearings on motor shafts wear out. The transmission between the motor and the load, which is inherently more complex than the piston and cylinder used in a hydraulic actuator, is also susceptible to failure. In both electrical and hydraulic systems a mechanical failure of an actuator, e.g. gear or bearing failure, etc., can result in a loss of mechanical function of the actuator. In addition, electrical systems can fail. One type of electrical failure occurs when there is a failure of the command loop that sends communications to an actuator. Another type of electrical failure occurs when a power loop within the actuator fails, such as a high power loop to a motor.

As electronic actuator systems are increasingly used in aircraft designs, new approaches are needed to address possible failure modes of these systems. Fault-tolerance, i.e., the ability to sustain one or more component failures or faults yet keep working, is needed in these systems. Because electric flight control systems do not have hydraulic fluid available for damping, there is a need for alternative fail safe systems that can be used in the event of a failure.

SUMMARY

Provided are pneumatic shaft positioning systems for use as secondary fail-safe systems during failure of primary systems. According to various examples, the pneumatic shaft positioning system includes a first pressure chamber, a pressurized gas source connected to the first pressure chamber, a first valve controlling flow of gas from the pressurized gas source into the first pressure chamber, and a first piston protruding into the first pressure chamber and slidably coupled to the first pressure chamber. The first piston forces a shaft into a predetermined position when the gas from the pressurized gas source fills the first pressure chamber.

In one aspect, which may include at least a portion of the subject matter of any of the preceding and/or following examples and aspects, a pneumatic shaft positioning system can also include a second pressure chamber and a second piston. The second pressure chamber is connected to the pressurized gas source. The first valve controls flow of the gas from the pressurized gas source into the second pressure chamber. The second piston protrudes into the second pressure chamber and is slidably coupled to the second pressure chamber. The second piston forces the shaft into the predetermined position when the gas from the pressurized gas source fills the second pressure chamber.

In one aspect, which may include at least a portion of the subject matter of any of the preceding and/or following examples and aspects, the first piston forces the shaft into the predetermined position in a first direction. The second piston forces the shaft into the predetermined position in a second direction. The first direction is opposite to the second direction.

In one aspect, which may include at least a portion of the subject matter of any of the preceding and/or following examples and aspects, the first piston and the second piston contact the shaft when the shaft is in the predetermined position.

In one aspect, which may include at least a portion of the subject matter of any of the preceding and/or following examples and aspects, the pneumatic shaft positioning system also includes a first stopper and a second stopper. The first stopper engages with the first piston when the shaft is in the predetermined position. The second stopper engages with the second piston when the shaft is in the predetermined position.

In one aspect, which may include at least a portion of the subject matter of any of the preceding and/or following examples and aspects, the pneumatic shaft positioning system also includes a third piston and a fourth piston. The third piston protrudes into the first pressure chamber and is slidably coupled to the first pressure chamber. The fourth piston protrudes into the second pressure chamber and is slidably coupled to the second pressure chamber. The third piston and the fourth piston force the shaft into the predetermined position when the gas from the pressurized gas source fills the first pressure chamber and the second pressure chamber.

In one aspect, which may include at least a portion of the subject matter of any of the preceding and/or following examples and aspects, the first pressure chamber and the second pressure chamber are separated by a second valve preventing flow of the gas from the first pressure chamber to the second pressure chamber. The first pressure chamber includes a release valve configured to reduce a pressure in the first pressure chamber relative to the second pressure chamber.

In one aspect, which may include at least a portion of the subject matter of any of the preceding and/or following examples and aspects, the first valve receives a signal from a flight control computer and controls the flow of the gas from the pressurized gas source into the first pressure chamber based on the signal.

In one aspect, which may include at least a portion of the subject matter of any of the preceding and/or following examples and aspects, the first valve includes a pyrotechnic burst disc.

In one aspect, which may include at least a portion of the subject matter of any of the preceding and/or following examples and aspects, the pneumatic shaft positioning system also includes an interlocking mechanism configured to engage the first piston when the shaft is in the predetermined position.

According to various examples, a mechanism includes a flight control computer system, a shaft having an axis, an actuator that drives movement of the shaft along the axis, and a pneumatic shaft positioning system. The actuator is communicatively coupled to the flight control computer. The pneumatic shaft positioning system includes a pressure chamber, a pressurized gas source connected to the pressure chamber, a valve controlling flow of gas from the pressurized gas source into the pressure chamber, and a piston protruding into the pressure chamber and slidably coupled to the pressure chamber. The valve is communicatively coupled to the flight control computer system. The piston forces the shaft into a predetermined position when the gas from the pressurized gas source fills the pressure chamber.

In one aspect, which may include at least a portion of the subject matter of any of the preceding and/or following examples and aspects, the piston slides substantially parallel to a longitudinal axis of the shaft.

In one aspect, which may include at least a portion of the subject matter of any of the preceding and/or following examples and aspects, the flight control computer system receives a failure signal from the actuator when the actuator fails and to sends an activation signal to the valve of the pneumatic shaft positioning system.

In one aspect, which may include at least a portion of the subject matter of any of the preceding and/or following examples and aspects, the actuator disengages from the shaft when the actuator fails.

In one aspect, which may include at least a portion of the subject matter of any of the preceding and/or following examples and aspects, the actuator is an electro-mechanical actuator.

According to various examples, a process associated with a pneumatic shaft positioning system is provided. The pneumatic shaft positioning system includes a pressure chamber, a pressurized gas source connected to the pressure chamber, a valve controlling flow of gas from the pressurized gas source into the pressure chamber, and a piston protruding into the pressure chamber and slidably coupled to the pressure chamber. The valve is activated. The activated valve allows the flow of gas from the pressurized gas source into the pressure chamber thereby pressurizing the pressure chamber and forcing the piston out of the pressure chamber. The shaft is contacted with the piston. While contacting the shaft with the piston, the piston is extended out of the pressure chamber thereby moving the shaft to a predetermined position.

In one aspect, which may include at least a portion of the subject matter of any of the preceding and/or following examples and aspects, an activation signal is received at the valve. The valve is activated in response to receiving the activation signal.

In one aspect, which may include at least a portion of the subject matter of any of the preceding and/or following examples and aspects, the shaft is disengaged from an actuator prior to moving the shaft into the predetermined position.

In one aspect, which may include at least a portion of the subject matter of any of the preceding and/or following examples and aspects, the piston is locked when the shaft is in the predetermined position. Locking the piston prevents the piston from moving slidably relative to the pressure chamber.

In one aspect, which may include at least a portion of the subject matter of any of the preceding and/or following examples and aspects, the gas is released from the pressure chamber thereby allowing the shaft to move into a new position.

These and other embodiments are described further below with reference to the figures.

DETAILED DESCRIPTION OF EXAMPLE EMBODIMENTS

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

As electronic actuator systems are increasingly used in aircraft designs, new approaches are needed to address possible failure modes of these systems. Fault-tolerance, i.e., the ability to sustain one or more component failures or faults yet keep working, is needed in these systems. Because electric flight control systems do not have hydraulic fluid available for damping, there is a need for alternative fail safe systems that can be used in the event of a failure.

A primary flight control system requires the control surfaces to be stable even after failures occur in the actuation systems. In the case of a primary flight control system failure, the control surface must continue to be stable by either maintaining sufficient damping or locking in place. If the control surface is not damped or locked, the surface can become unstable, resulting in a catastrophic failure of the wing.

Various mechanisms and processes are presented that are designed to stabilize primary flight control surfaces in the event of a failure to the primary flight control actuation system. In particular, various examples provide a secondary fail-safe system that positions and holds the flight control surface should the primary drive system fail, thereby providing stability of the flight control surface. Specifically, a pneumatic source is used to stabilize and damp an electromechanical actuator in a failure mode scenario, according to various examples. The use of pneumatic actuators provides a lightweight approach that can yield savings in weight and costs in aircraft designs.

Although various examples described relate to the use of a pneumatic positioning system with aircraft designs, the pneumatic positioning system can be used with various mechanical devices and vehicles. For instance, a pneumatic positioning system can be used in commercial airplanes, military airplanes, rotorcraft, launch vehicles, spacecraft/satellites, and the like. Furthermore, a pneumatic positioning system can be used in vehicle guidance control systems. In addition, the pneumatic positioning system can be used in various devices such as, but not limited to, robots, land vehicles, rail vehicles, gates, doors, and the like.

System Examples

Figure 1:
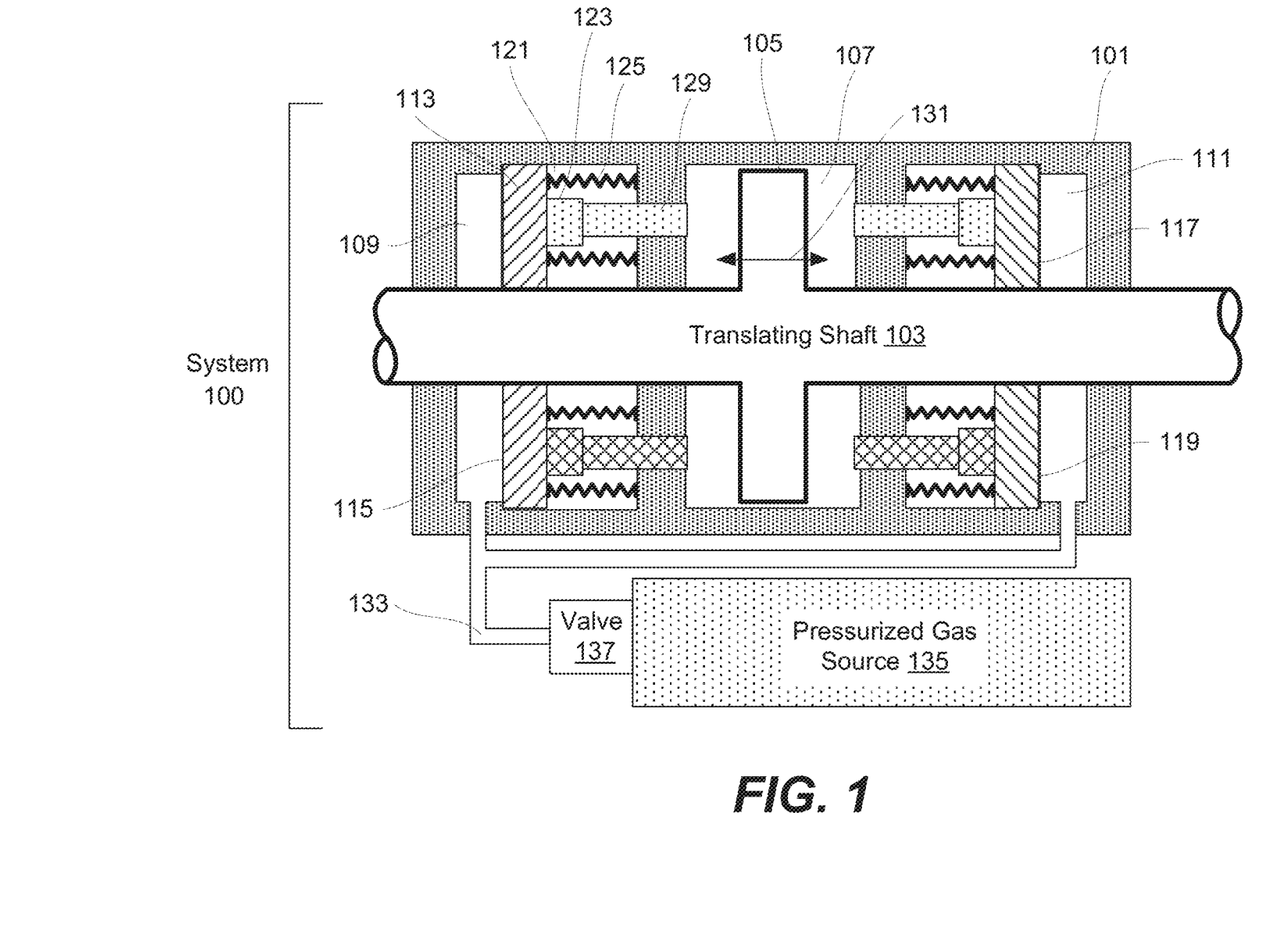
FIG. 1 is a diagrammatic representation of a pneumatic shaft positioning system, in accordance with some embodiments.

Various mechanisms and processes are presented that provide a pneumatic shaft positioning system that can be used as a secondary fail-safe system when a primary system fails. With reference to FIG. 1, shown is a diagrammatic representation of a pneumatic shaft positioning system, in accordance with some embodiments. As shown, system 100 includes a housing 101 with pressure chamber 109, pressure chamber 111, and center chamber 107. Translating shaft 103 passes through housing 101 and includes flange 105. Flange 105 can project out from two sides of translating shaft 103 in some examples as shown, and can form a ring or other shape around translating shaft in other examples. Translating shaft 103 can reciprocate or translate 131 in the direction of its longitudinal axis within center chamber 107. This translating shaft 103 can be a part of another mechanical system or actuator that provides control of translation 131 during normal operation. Depending on the application, translation can be in the range of about ½ inch in some examples, in the range of 5 to 10 inches in other examples, or any other distance depending on how the translating shaft 103 is used within a mechanical device or actuator.

In the present embodiment, pressurized gas source 135 is connected to pressure chambers 109 and 111 via gas lines 133 and is separated from pressure chambers 109 and 111 by valve 137. Pressurized gas source 135 can be pressurized gaseous nitrogen (GN2) stored in a bottle, according to various examples, or any other suitable gas. A bottle of GN2 can be obtained from any source, such as an off-the-shelf bottle that is commercially available. In some examples, the pressure of the GN2 within the bottle can be in the range of about 3000-4000 psi. According to various embodiments, valve 137 can be a pyrotechnic valve, and can include a pyrotechnic burst disk that is designed to seal pressurized gas source from gas line 133 until the pyrotechnic burst disk is ruptured. The pyrotechnic valve can be obtained as an off-the-shelf item that is commercially available, and is intended for a one-time use.

According to the present embodiment, pistons 113 and 115 are located within pressure chamber 109 and pistons 117 and 119 are located within pressure chamber 111. Each of the pistons has a shaft 129 (this shaft is described with regard to piston 113, but this description applies to the other pistons as well) that extends through a wall in housing 101 to center chamber 107. The piston 113 is held in place by springs 125, which keep the shaft 129 from entering the center chamber 107 and out of the way of the translating shaft 103 during normal actuator operation. These springs 125 are located within displacement chamber 121.

In the present embodiment, pneumatic shaft positioning system 100 serves as a secondary fail-safe system when a primary system fails. In particular, motion of translating shaft 103 can be controlled by an actuator (not shown) that is part of the primary system. During normal actuator operation, the pistons 113, 115, 117, and 119 are held in a retract position by their respective coil springs, as shown. With the pistons 113, 115, 117, and 119 retracted, the translating shaft 103 is free to move through a normal stroke without interference from the pistons. When commanded by an electrical signal, a burst disk internal to the pyrotechnic valve 137 ruptures allowing nitrogen gas (GN2) to be expelled from the pressurized gas source 135. The GN2 then flows through the gas lines 133 and enters into pressure chambers 109 and 111. The GN2 pushes the pistons into center chamber 107 and forces the pistons up against the translating shaft flange 105. In some examples, the pistons drive the translating shaft 103 to a predetermined position, such as a center position, and hold this position, as shown in FIG. 2A.

Figure 2A:
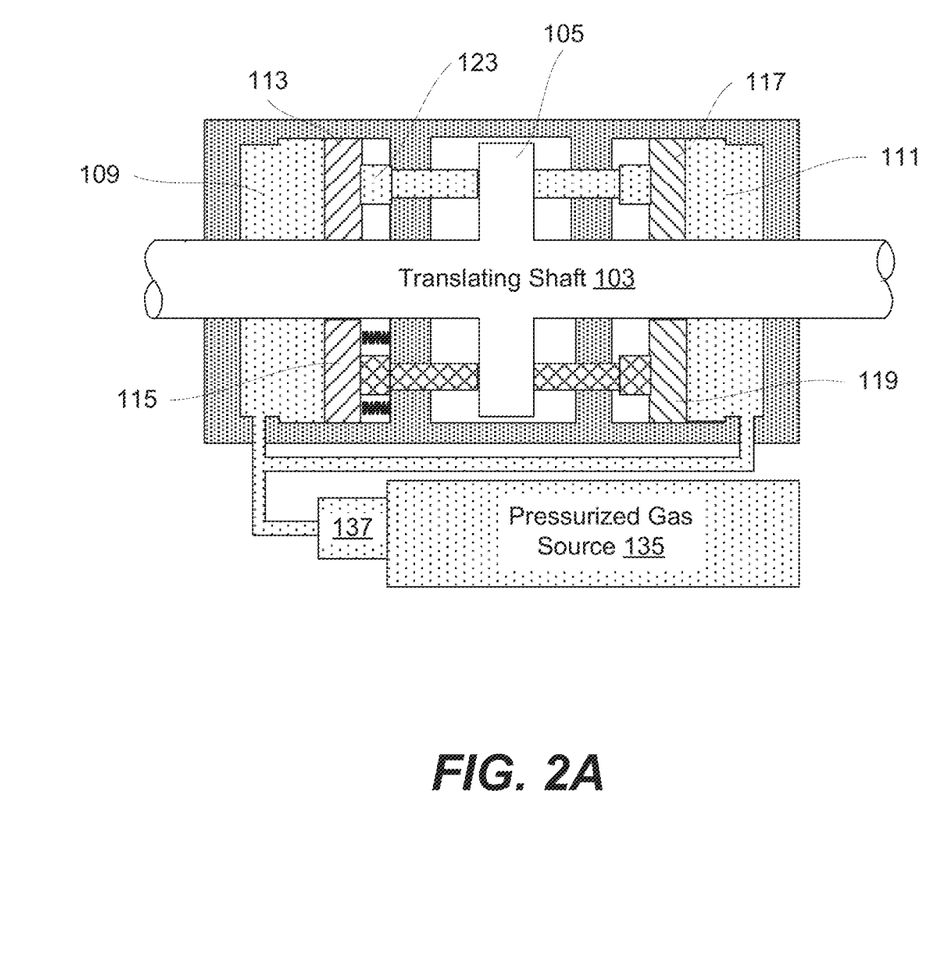
FIG. 2A is a diagrammatic representation of a pneumatic shaft positioning system after a pressurized gas source has been released, in accordance with some embodiments.

With reference to FIG. 2A, shown is one example of of a pneumatic shaft positioning system after the pressurized gas source has been released. In particular, GN2has been released into pressure chambers 109 and 111, and pistons 113, 115, 117, and 119 have been pushed against the flange 105 of translating shaft 103 such that translating shaft 103 is held in a steady position. In the present example, the springs are compressed, but only one set is shown in the diagram for the sake of clarity. In addition, stoppers, such as stopper 123 on piston 113, prevent the piston shafts from overextending into the center chamber.

In the present embodiment, the translating shaft 103 and the pistons ride on seals, so the GN2 is trapped in the housing cavities 109 and 111, and the pressure on the pistons is maintained over time, thereby holding the translating shaft 103 at the neutral position shown. In some examples, the seal friction can be about 10 percent of the load capacity of a piston. The pressure on the pistons can be in the range of about 1500 psi in some examples, such as when the pressurized gas source holds about 3000 psi of GN2 before it is released in the pressurized chambers 109 and 111. However, it should be recognized that these pressures can vary depending on the size and configuration of the pressure chambers, pistons, translating shaft, and other components of the system.

Once the system has completed its task of stabilizing translating shaft 103, and this configuration is no longer needed, the pressurized gas source 135 and pyrotechnic valve 137 can be replaced. The pistons can be restored to their original positions, and the pneumatic shaft positioning system can be used again alongside the primary actuator as a fail-safe system during future operations. As described above, the pneumatic shaft positioning system is activated during a failure of a primary actuator or system. Accordingly, the system may stay in-tact as shown in FIG. 1 during normal operations for many repeated uses of the primary actuator without being triggered or activated.

In the example shown in FIG. 2A, translating shaft is 103 held in a center position as its predetermined position. In some embodiments, the pistons can be positioned beforehand to control where the shaft will end up when the valve is triggered. The piston stroke can be adjusted to create a desired position at release. In some examples, the predetermined position can be a neutral position that achieves the optimal aerodynamic system, such as to reduce drag forces, etc. In other examples, a different predetermined location may be desirable.

Figure 2B:
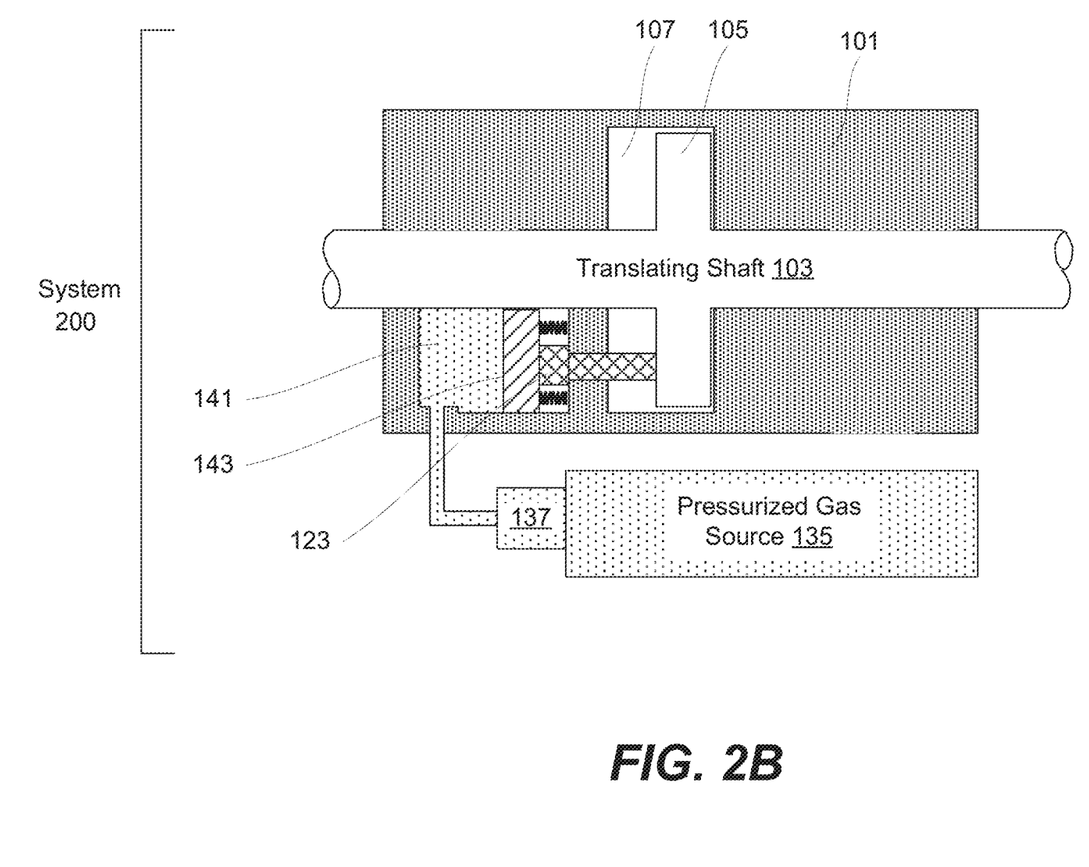
FIG. 2B is another diagrammatic representation of a pneumatic shaft positioning system after a pressurized gas source has been released, in accordance with some embodiments.

With reference to FIG. 2B, shown is an alternative embodiment of a pneumatic shaft positioning system after a pressurized gas source has been released, in accordance with some embodiments. In particular, system 200 includes a single pressure chamber 141 and piston 143. In the present example, GN2 has been released into pressure chamber 141 and piston 143 has been pushed against the flange 105 of translating shaft 103 such that translating shaft 103 is held into a steady position. In the present example, the springs are compressed and stopper 123 prevents the piston shaft from overextending into the center chamber 107 where the flange is located. As shown, translating shaft 103 is held up against a wall of center chamber 107, thereby stabilizing translating shaft 103 in this predetermined position. Although the present example shows the use of one piston, an additional piston can be used and pressure chamber 141 can be extended to accommodate this additional piston in some embodiments. In these embodiments, the two pistons would both press flange 105 against the wall of center chamber 107. Additionally, any number of pistons can be used depending on the particular characteristics of the translating shaft, flange, pressure chamber, and other parts of the system.

In the present embodiment, the translating shaft 103 and the piston ride on seals so the GN2 is trapped in the pressure chamber 141 and gas lines, and the pressure on the piston is maintained over time, thereby holding the translating shaft 103 at the stabilized position shown. Once the system has completed its task of stabilizing translating shaft 103, and this configuration is no longer needed, the pressurized gas source 135 and pyrotechnic valve 137 can be replaced. The piston can be restored to its original position, and the pneumatic shaft positioning system can be used again with the actuator as a fail-safe system during future operations. As described above, the pneumatic shaft positioning system is activated during a failure of a primary actuator or system.

Figure 3A:
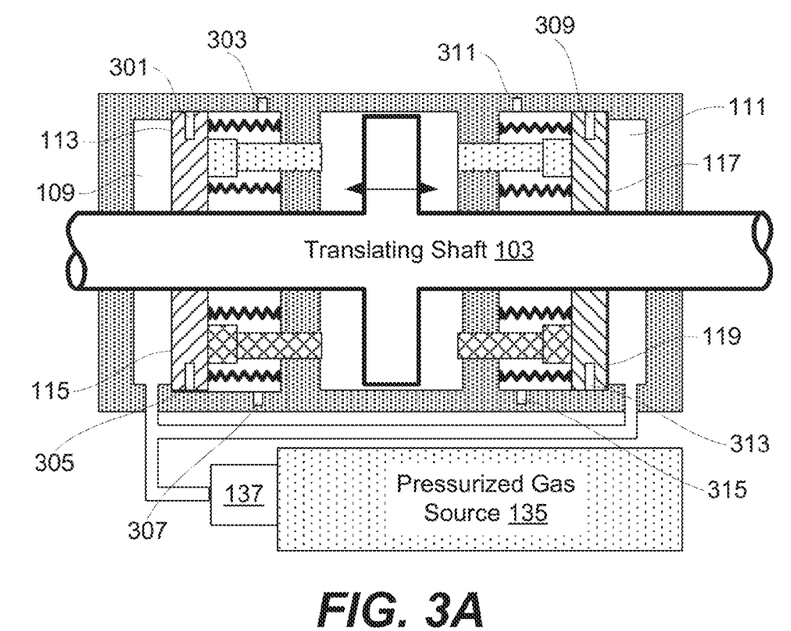
FIGS. 3A-3B are diagrammatic representations of a pneumatic shaft positioning system with an interlocking mechanism, in accordance with some embodiments.
Figure 3B:
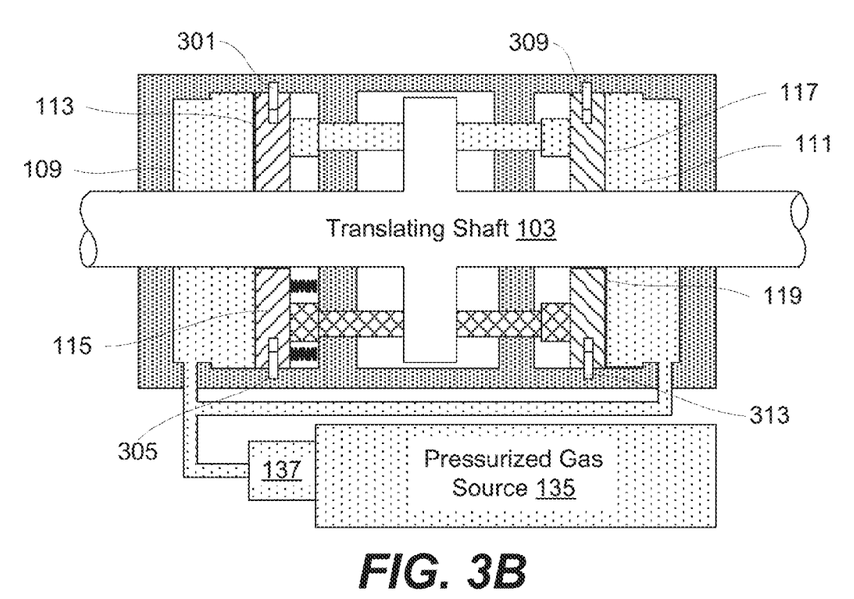

According to various embodiments, an interlocking mechanism can be used to secure the pistons in a pneumatic shaft positioning system once they have been activated and have reached a predetermined position. With reference to FIG. 3A, shown is an example of a pneumatic shaft positioning system with an interlocking mechanism. In particular, the pneumatic shaft positioning system shown in the present embodiment is similar to the system shown in FIG. 1 as described above, but also features an interlocking system that includes pins 301, 305, 309, and 313 located in their respective pistons 113, 115, 117, and 119. According to various embodiments, each pin can include a spring that allows it to rest in a retracted position as shown when the system has not been activated and the pistons are not engaged. However, these pins can expand into their mating recessed notches 303, 307, 311, and 315 when they are aligned with these recessed notches, as shown in FIG. 3B. For instance, a D-tent spring can be used as pins in some examples.

With reference to FIG. 3B, shown is shown is an example of a pneumatic shaft positioning system with an engaged interlocking mechanism. In particular, the pneumatic shaft positioning system shown in the present embodiment is similar to the system shown in FIG. 2A as described above, but also features an interlocking system that includes pins 301, 305, 309, and 313 located in their respective pistons 113, 115, 117, and 119. In the present example, pressurized gas source 135 has been released into pressure chambers 109 and 111 after pyrotechnic valve 137 has been activated. Pistons 113, 115, 117, and 119 have been pushed against the flange of translating shaft 103 such that translating shaft 103 is held in a steady predetermined position. In the present example, the springs are compressed, but only one set is shown in the diagram for the sake of clarity.

In the present embodiment, when the pistons are pushed up against the flange of translating shaft 103 such that translating shaft 103 has reached its predetermined position, pins 301, 305, 309, and 313 align with recessed notches 303, 307, 311, and 315 and the pins extend into these recessed notches. When the pins are extended into the notches, as shown in FIG. 3B, the pistons are physically locked in place by the interlocking mechanism.

In an alternative embodiment, the interlocking mechanism can include interlocking cams for locking rotational motion of the shaft. For instance, a drive cam and locking cam can be used to engage each other when translating shaft is in the predetermined position and disengage each other when translating shaft during normal operations. Specifically, the drive cam and locking cam can use a rotating locking motion to engage each other in various embodiments.

According to various embodiments, additional or alternate features can be included in a pneumatic shaft positioning system. For instance, a pneumatic shaft positioning system can include pressure chambers designed to accommodate different pressures in some embodiments. By creating different pressures in the pressure chambers, the predetermined position that translating shaft is secured at when the system is activated can be adjusted based on the application.

Figure 4A:
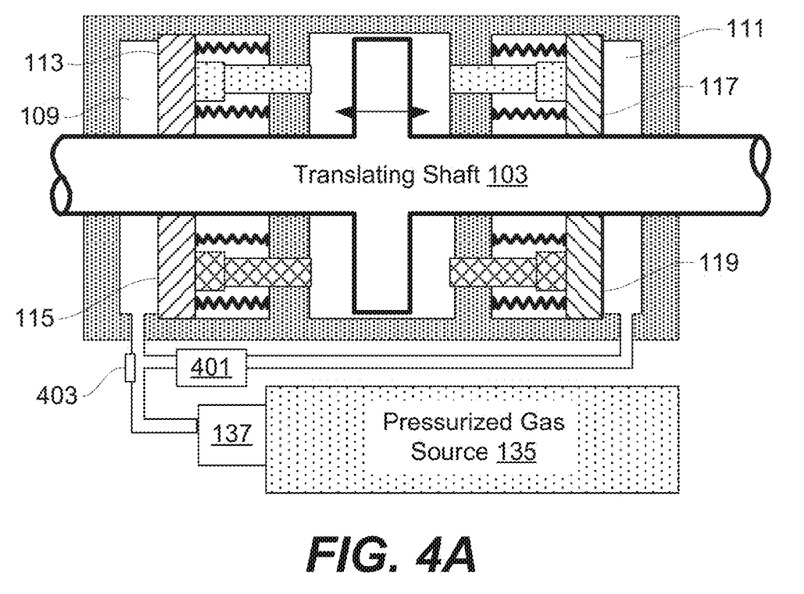
FIG. 4A is a diagrammatic representation of a pneumatic shaft positioning system with pressure valves, in accordance with some embodiments.

One way to create different pressures between the pressure chambers is to include valves in a pneumatic shaft positioning system. With reference to FIG. 4A, shown is a diagrammatic representation of a pneumatic shaft positioning system with pressure chamber valves, in accordance with some embodiments. In particular, the pneumatic shaft positioning system shown in the present embodiment is similar to the system shown in FIG. 1 as described above, but also features a one-way valve 401 and a release valve 403.

In the present embodiment, after pyrotechnic valve 137 ruptures allowing the nitrogen gas (GN2) to be expelled from the pressurized gas source 135, the GN2 is released into the gas lines and can flow freely into pressure chamber 109. In addition, the GN2 can also flow into pressure chamber 111 through one-way valve 401. In some examples, one-way valve 401 will let GN2 into pressure chamber 111 until it reaches a particular pressure. For instance, this pressure can be set at a lower pressure than the pressure in pressure chamber 109, such that pistons 117 and 119 are pushed into the center chamber a shorter distance than pistons 113 and 115 thereby positioning translating shaft 103 a little to the right of a centered position within the center chamber. In other examples, one-way valve 401 can allow GN2 to flow into pressure chamber 111 until it equilibrates with pressure chamber 109, but the GN2 in pressure chamber 111 will not be allowed to flow back into pressure chamber 109. If release valve 403 is triggered, gas can be released from pressure chamber 109 while pressure chamber 111 maintains a constant pressure. In yet other embodiments, release valve 403 can be included without one-way valve 401, and vice versa. In the embodiments in which release valve 403 is included without one-way valve 401, release valve 403 can be used to release the GN2 after the system has completed its task of stabilizing translating shaft 103, and this configuration is no longer needed. For instance, release valve 403 can be used to let out the pressurized gas and reset the system after landing or during servicing of the aircraft. In some examples, release valve 403 can be used to return translating shaft 103 to an operating position during flight.

Figure 4B:
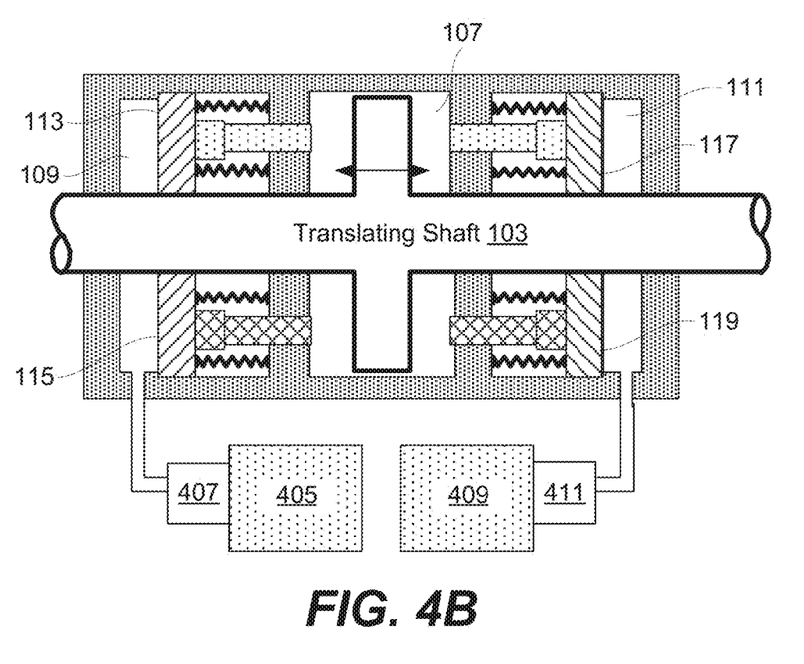
FIG. 4B is a diagrammatic representation of a pneumatic shaft positioning system with multiple pressurized gas sources, in accordance with some embodiments.

Another way to create different pressures between the pressure chambers is to include separate pressurized gas sources for each of the pressure chambers. With reference to FIG. 4B, shown is a diagrammatic representation of a pneumatic shaft positioning system with multiple pressurized gas sources, in accordance with some embodiments. In particular, the pneumatic shaft positioning system shown in the present embodiment is similar to the system shown in FIG. 1 as described above, except that pressure chamber 109 is connected to pressurized gas source 405 via pyrotechnic valve 407 and pressure chamber 111 is connected to pressurized gas source 409 via pyrotechnic valve 411.

In the present embodiment, when commanded by an electrical signal, a burst disk internal to the pyrotechnic valve 407 ruptures allowing the nitrogen gas (GN2) to be expelled from the pressurized gas source 405 and a burst disk internal to the pyrotechnic valve 411 ruptures allowing the nitrogen gas (GN2) to be expelled from the pressurized gas source 409. Next, the GN2 from pressurized gas source 405 then flows through the gas lines and enters into pressure chamber 109, thereby pushing the pistons 113 and 115 into center chamber 107 and forcing the pistons up against the flange of translating shaft 103. Additionally, the GN2 from pressurized gas source 409 flows through the gas lines and enters into pressure chamber 111, pushing the pistons 117 and 119 into center chamber 107 and forcing the pistons up against the flange of translating shaft 103.

According to various embodiments, the pistons drive the translating shaft 103 to a predetermined position. In some examples, this predetermined position may be at a position other than centered within center chamber 107. For instance, if pressure chamber 109 contains a lower pressure of GN2 than pressure chamber 111, pistons 113 and 115 are pushed into the center chamber a shorter distance than pistons 117 and 119 thereby positioning translating shaft 103 at a location to the left of a centered position within the center chamber 107. By adjusting the relative pressures of pressure chambers 109 and 111, the predetermined position for translating shaft 103 can be adjusted depending on the application. The pressure of each chamber can be adjusted in various ways. For instance, the size of the chamber can be adjusted or the pressure of the pressurized gas source 135 can be adjusted.

Operating Examples

Figure 5:
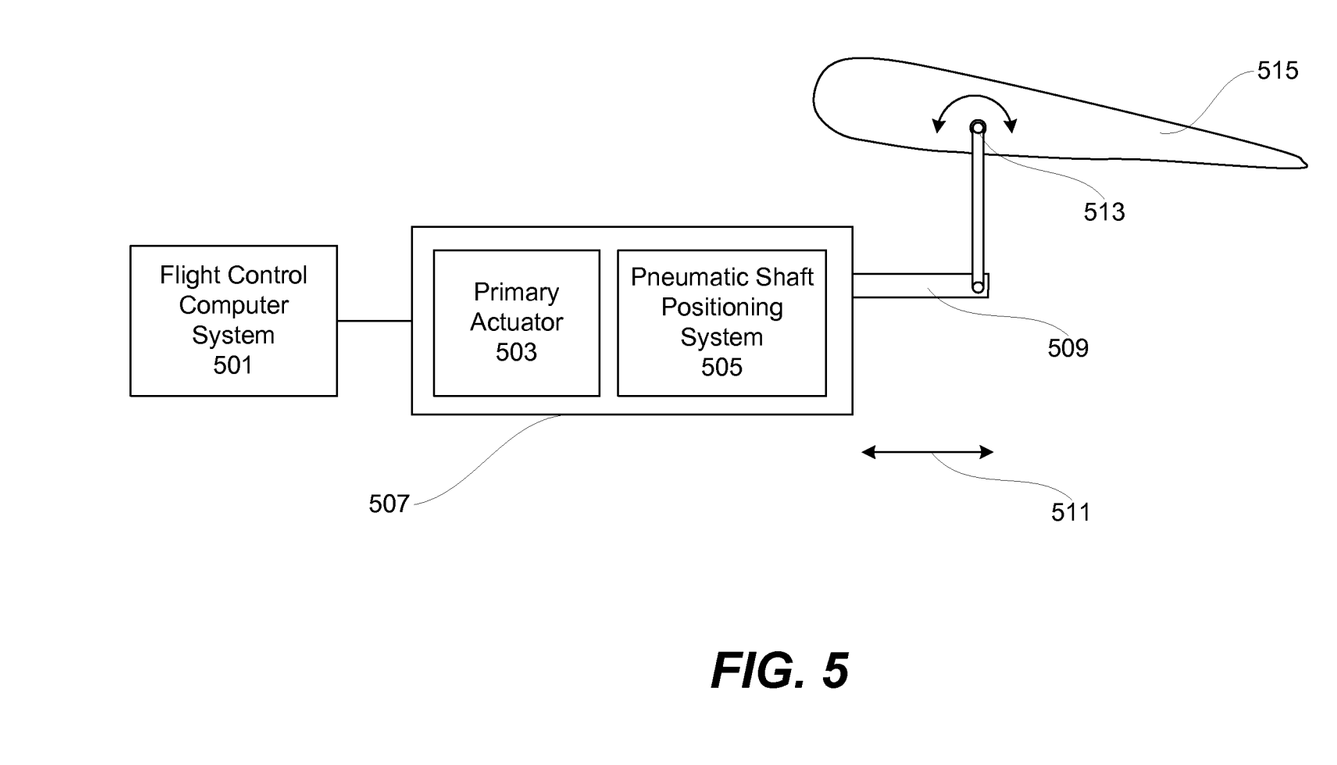
FIG. 5 is a diagrammatic representation of an aircraft flight control system, in accordance with some embodiments.

According to various embodiments, a pneumatic shaft positioning system, examples of which are described more fully above, can be used as a secondary fail-safe system when a primary system fails. With reference to FIG. 5, shown is a diagrammatic representation of an aircraft flight control system, in accordance with some embodiments. In particular embodiments, a pneumatic shaft positioning system can be used in aircraft control systems. In particular, a pneumatic shaft positioning system can be used as a secondary fail-safe system when a primary actuator fails.

Aircraft (not shown for clarity, but well known in the art) are well-known to have wings that are attached to a fuselage. Control surfaces in the wings control the rate of climb and descent, among other things. The tail section attached to the rear of the fuselage provides steering and maneuverability. An engine provides thrust and can be attached to the plane at the wings, in the tail, or to the fuselage. Inasmuch as aircraft structures are well-known, their illustration is omitted here for simplicity. Various actuators control the movement of flight control surfaces in the wings, tail, landing gear, landing gear bay doors, engine thrust reversers, and the like.

In the present embodiment, one example of a control surface 515 is shown. In this example, translating shaft 509 is coupled to a pivot point 513 of a control surface 515 of an aircraft. Movement of the translating shaft 509 in the direction indicated by the arrows 511 is but one way that primary actuator 503 can cause a control surface, e. g., spoilers, flaps, elevators, rudder or ailerons, to move and thereby control the aircraft. Similar translation can control other flight control surfaces, fuselage doors, landing gear, thrust reverses, and the like.

According to the present embodiment, a flight control computer system 501 is electrically coupled to primary actuator 503 and pneumatic shaft positioning system 505, both of which are located in housing 507. In some examples, primary actuator 503 can be an electrically powered linear actuator. During normal operations, primary actuator 503 controls the movements of translating shaft 509. The pneumatic shaft positioning system 505 is only activated during a failure of primary actuator 503. Accordingly, pneumatic shaft positioning system remains inactive and does not interfere with primary actuator 503 or the movement of translating shaft 509 during normal operations. In addition, primary actuator may operate for many repeated uses without pneumatic shaft positioning system 505 being triggered or activated.

Figure 6:
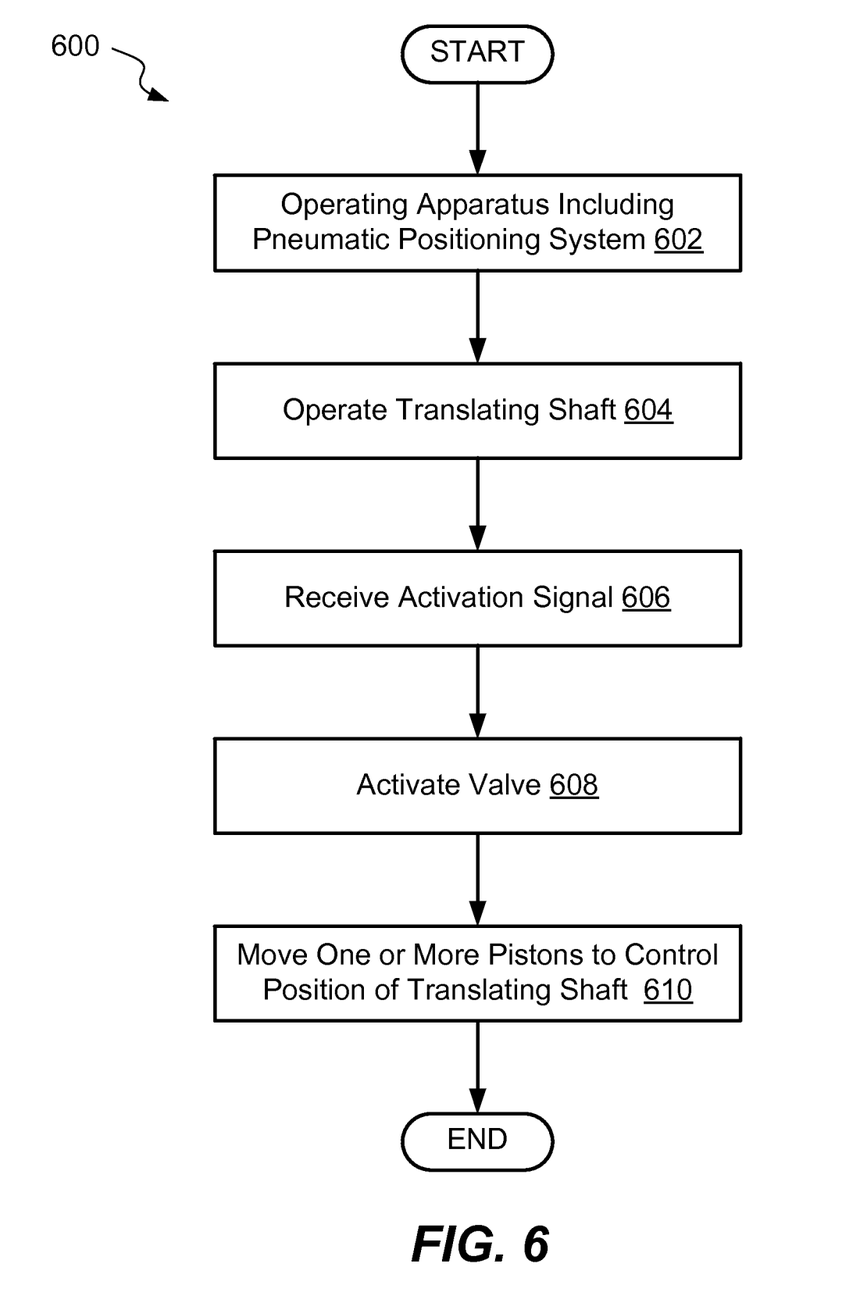
FIG. 6 is a flow process diagram for positioning a shaft with a pneumatic shaft positioning system, in accordance with some embodiments.

With reference to FIG. 6, shown is a flow process diagram for positioning a shaft with a pneumatic shaft positioning system 600, in accordance with some embodiments. In the present embodiment, an apparatus with a pneumatic shaft positioning system is provided at 602. For instance, one example of such an apparatus is an aircraft flight control system as shown in FIG. 5, although various apparatuses can be used with the process described herein. At 604, the translating shaft is operated under normal conditions. In particular, a primary actuator may control the motion of the translating shaft during normal operations. Next, an activation signal is received at 606. In the example shown in FIG. 5, flight control computer system 501 may detect that primary actuator 503 has failed and may consequently issue an activation signal for pneumatic shaft positioning system. At 608, the pyrotechnic valve (or valves, depending on the application) is activated in the pneumatic positioning system. Accordingly, failure of the primary actuator system triggers the pyrotechnic device which opens a burst diaphragm to release pressurized gas within the pneumatic positioning system. Specifically, pressurized gas contained in a pressure vessel is released into pressure chambers of the pneumatic positioning system to move one or more pistons into positions that stabilize the translating shaft at 610. In the example shown in FIG. 5, driving the translating shaft to a predetermined position with the pneumatic positioning system and holding the translating shaft in this position is designed to maintain stability of the flight control surface. In some embodiments, once pneumatic shaft positioning system 505 is activated, primary actuator 503 can be disengaged from translating shaft 509. Although the process described in the present embodiment relates to a pneumatic positioning system used with an aircraft, it should be recognized that this process can be used with various devices, systems, and the like.

Examples of Aircraft

Figure 7A:
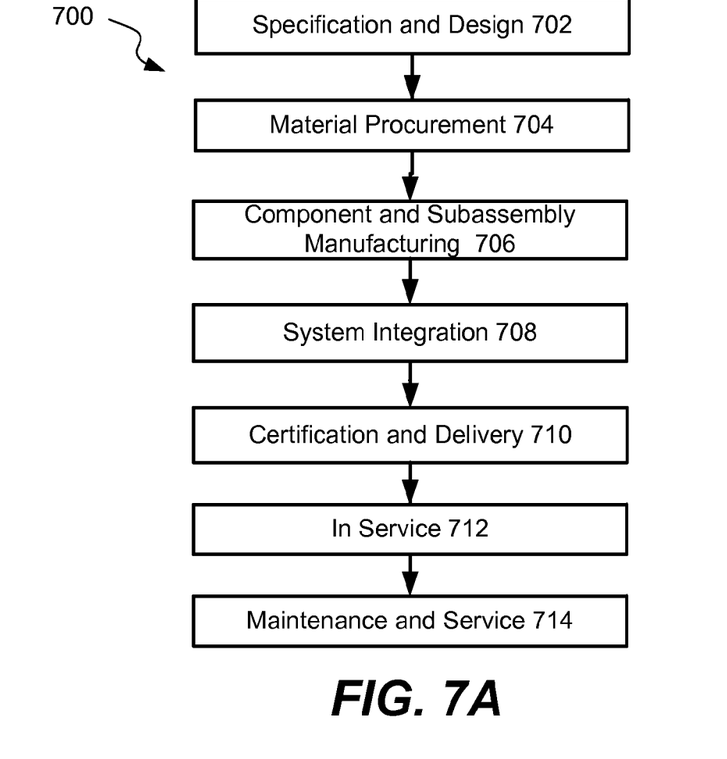
FIG. 7A is a process flowchart reflecting key operations in the life cycle of an aircraft from early stages of manufacturing to entering service, in accordance with some embodiments.

An aircraft manufacturing and service method 700 shown in FIG. 7A and an aircraft 730 shown in FIG. 7B will now be described to better illustrate various features of processes and systems presented herein. During pre-production, aircraft manufacturing and service method 700 may include specification and design 702 of aircraft 730 and material procurement 704. The production phase involves component and subassembly manufacturing 706 and system integration 708 of aircraft 730. Thereafter, aircraft 730 may go through certification and delivery 710 in order to be placed in service 712. While in service by a customer, aircraft 730 is scheduled for routine maintenance and service 714 (which may also include modification, reconfiguration, refurbishment, and so on). While the embodiments described herein relate generally to servicing of commercial aircraft, they may be practiced at other stages of the aircraft manufacturing and service method 700.

Each of the processes of aircraft manufacturing and service method 700 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

Figure 7B:
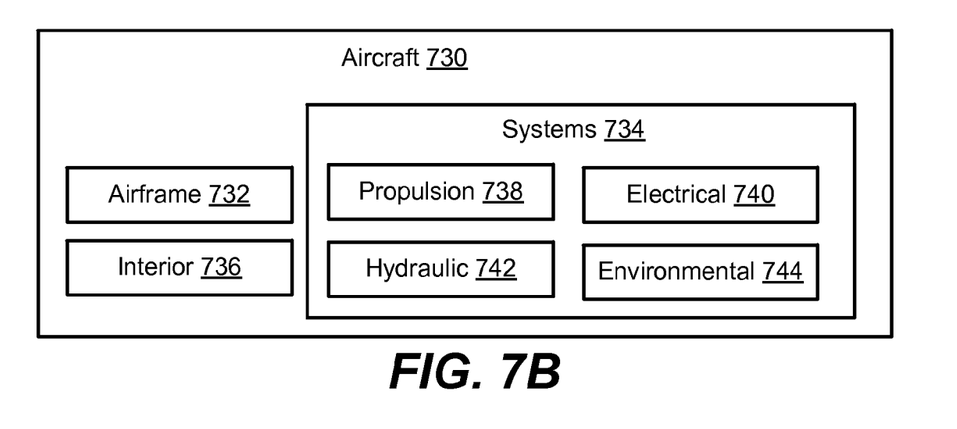
FIG. 7B is a block diagram illustrating various key components of an aircraft, in accordance with some embodiments.

As shown in FIG. 7B, aircraft 730 produced by aircraft manufacturing and service method 700 may include airframe 732, interior 736, and multiple systems 734. Examples of systems 734 include one or more of propulsion system 738, electrical system 740, hydraulic system 742, and environmental system 744. Any number of other systems may be included in this example. Although an aircraft example is shown, the principles of the disclosure may be applied to other industries, such as the automotive industry.

Apparatus and methods embodied herein may be employed during any one or more of the stages of aircraft manufacturing and service method 700. For example, without limitation, components or subassemblies corresponding to component and subassembly manufacturing 706 may be fabricated or manufactured in a manner similar to components or subassemblies produced while aircraft 730 is in service.

Also, one or more apparatus embodiments, method embodiments, or a combination thereof may be utilized during component and subassembly manufacturing 706 and system integration 708, for example, without limitation, by substantially expediting assembly of or reducing the cost of aircraft 730. Similarly, one or more of apparatus embodiments, method embodiments, or a combination thereof may be utilized while aircraft 730 is in service, for example, without limitation, maintenance and service 714 may be used during system integration 708 and/or maintenance and service 714 to determine whether parts may be connected and/or mated to each other.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A pneumatic shaft positioning system comprising:
   a first pressure chamber;
   a translating shaft protruding through the first pressure chamber;
   a pressurized gas source coupled to the first pressure chamber;
   a first valve controlling flow of gas from the pressurized gas source into the first pressure chamber; and
   a first piston protruding into the first pressure chamber and slidably coupled to the first pressure chamber,
     wherein the first piston comprises a first shaft,
     wherein a longitudinal axis of the first shaft is parallel and non-collinear to a longitudinal axis of the translating shaft and
     wherein the first shaft of the first piston forces the translating shaft into a predetermined position when the gas from the pressurized gas source fills the first pressure chamber.

2. The pneumatic shaft positioning system of claim 1, further comprising a second pressure chamber and a second piston,
   wherein the second pressure chamber is connected to the pressurized gas source,
   wherein the first valve controls flow of the gas from the pressurized gas source into the second pressure chamber, and
   wherein the second piston protrudes into the second pressure chamber and is slidably coupled to the second pressure chamber, and
   wherein a second shaft of the second piston forces the translating shat into the predetermined position when the gas from the pressurized gas source fills the second pressure chamber.

3. The pneumatic shaft positioning system of claim 2,
   wherein the first shaft of the first piston forces the translating shaft into the predetermined position in a first direction,
   wherein the second shaft of the second piston forces the translating shaft into the predetermined position in a second direction, and wherein the first direction is opposite to the second direction.

4. The pneumatic shaft positioning system of claim 3, wherein the first shaft of the first piston and the second shaft of the second piston contact the translating shaft when the translating shaft is in the predetermined position.

5. The pneumatic shaft positioning system of claim 4, further comprising a first stopper and a second stopper,
   wherein the first stopper engages with the first piston when the translating shaft is in the predetermined position, and
   wherein the second stopper engages with the second piston when the translating shaft is in the predetermined position.

6. The pneumatic shaft positioning system of claim 2, wherein the first pressure chamber and the second pressure chamber are separated by a second valve preventing flow of the gas from the first pressure chamber to the second pressure chamber, and wherein the first pressure chamber comprises a release valve configured to reduce a pressure in the first pressure chamber relative to the second pressure chamber.

7. The pneumatic shaft positioning system of claim 1, wherein the first valve receives a signal from a flight control computer and controls the flow of the gas from the pressurized gas source into the first pressure chamber based on the signal.

8. The pneumatic shaft positioning system of claim 1, wherein the first valve comprises a pyrotechnic burst disc.

9. The pneumatic shaft positioning system of claim 1, further comprising an interlocking mechanism configured to engage the first piston when the translating shaft is in the predetermined position.

10. An apparatus comprising:
    a flight control computer system;
    a translating shaft having a longitudinal axis;
    an actuator for driving the translating shaft along the longitudinal axis,
        wherein the actuator is communicatively coupled to the flight control computer; and
    a pneumatic shaft positioning system comprising a pressure chamber, a pressurized gas source connected to the pressure chamber, a valve controlling flow of gas from the pressurized gas source into the pressure chamber, and a piston protruding into the pressure chamber and slidably coupled to the pressure chamber,
        wherein the valve is communicatively coupled to the flight control computer system,
        wherein the piston comprises a piston shaft,
        wherein a longitudinal axis of the piston shaft is parallel and non-collinear to a longitudinal axis of the translating shaft, and
        wherein the piston shaft forces the translating shaft into a predetermined position when the gas from the pressurized gas source fills the pressure chamber.

11. The apparatus of claim 10, wherein the piston slides substantially parallel to the longitudinal axis of the translating shaft.

12. The apparatus of claim 10, wherein the flight control computer system receives a failure signal from the actuator when the actuator fails and sends an activation signal to the valve of the pneumatic shaft positioning system.

13. The apparatus of claim 10, wherein the actuator disengages from the translating shaft when the actuator fails.

14. The apparatus of claim 10, wherein the actuator is an electro-mechanical actuator.

15. A method comprising:
    operating a pneumatic shaft positioning system comprising a pressure chamber, a pressurized gas source connected to the pressure chamber, a valve controlling flow of gas from the pressurized gas source into the pressure chamber, and a piston protruding into the pressure chamber and slidably coupled to the pressure chamber;
    activating the valve,
        wherein the activated valve allows the flow of gas from the pressurized gas source into the pressure chamber thereby pressurizing the pressure chamber and forcing a piston shaft of the piston out of the pressure chamber;
    contacting a translating shaft with the piston shaft
        wherein a longitudinal axis of the piston shaft is parallel and non-collinear to a longitudinal axis of the translating shaft: and
    while contacting the translating shaft with the piston shaft, extending the piston shaft out of the pressure chamber thereby moving the translating shaft to a predetermined position.

16. The method of claim 15, further comprising receiving an activation signal at the valve, wherein the valve is activated in response to receiving the activation signal.

17. The method of claim 15, further comprising disengaging the translating shaft from an actuator prior to moving the translating shaft into the predetermined position.

18. The method of claim 15, further comprising locking the piston when the translating shaft is in the predetermined position, wherein locking the piston prevents the piston from moving slidably relative to the pressure chamber.

19. The method of claim 15, further comprising releasing the gas from the pressure chamber thereby allowing the translating shaft to move into a new position.

* * * * *